United States Patent
Bennie et al.

(10) Patent No.: US 11,447,093 B1
(45) Date of Patent: Sep. 20, 2022

(54) SAFETY BELT D-RING POSITIONING

(71) Applicant: FORD GLOBAL TECHNOLOGIES, LLC, Dearborn, MI (US)

(72) Inventors: Clara Bennie, Sterling Heights, MI (US); Brian Bennie, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/411,458

(22) Filed: Aug. 25, 2021

(51) Int. Cl.
*B60R 22/20* (2006.01)
*B60R 22/48* (2006.01)
*B60R 22/24* (2006.01)

(52) U.S. Cl.
CPC ............ *B60R 22/201* (2013.01); *B60R 22/48* (2013.01); *B60R 22/24* (2013.01); *B60R 2022/208* (2013.01); *B60R 2022/485* (2013.01); *B60R 2022/4866* (2013.01)

(58) Field of Classification Search
CPC ....... B60R 22/201; B60R 22/48; B60R 22/24; B60R 2022/485; B60R 2022/4866
See application file for complete search history.

(56) References Cited

U.S. PATENT DOCUMENTS

| | | | |
|---|---|---|---|
| 6,786,510 B2 | 9/2004 | Roychoudhury et al. | |
| 9,434,349 B1 * | 9/2016 | Perkins | B60R 22/03 |
| 10,035,513 B2 | 7/2018 | Miller et al. | |
| 10,252,694 B2 | 4/2019 | Lin et al. | |
| 10,293,782 B1 * | 5/2019 | Schaub | B60N 2/002 |
| 10,981,537 B2 | 4/2021 | Vega et al. | |
| 2015/0232061 A1 * | 8/2015 | Cuddihy | B60R 16/037 701/45 |
| 2015/0251618 A1 * | 9/2015 | Ghannam | B60R 22/48 340/457.1 |
| 2016/0311399 A1 * | 10/2016 | Miller | B60R 21/01512 |
| 2018/0361984 A1 * | 12/2018 | Lin | G06V 40/11 |
| 2020/0094776 A1 | 3/2020 | Ohno | |
| 2020/0320318 A1 * | 10/2020 | Ramaglia | G06V 20/59 |

FOREIGN PATENT DOCUMENTS

| | | | |
|---|---|---|---|
| DE | 3736056 A1 * | 4/1989 | |
| JP | 2009227079 A * | 10/2009 | |
| KR | 20120072142 A * | 7/2012 | |
| WO | 2009025594 A1 | 2/2009 | |

* cited by examiner

*Primary Examiner* — Jonathan Ng
*Assistant Examiner* — Scott F. Underwood
(74) *Attorney, Agent, or Firm* — Frank L. Lollo; MacMillan, Sobanski & Todd, LLC

(57) ABSTRACT

Guidance to a vehicle occupant is directed to manual adjustment of a height of a D-ring mechanism of a safety belt. First data of the occupant is collected which is indicative of a target height for the D-ring mechanism. Second data is collected indicative of a current height of the D-ring mechanism. The target height and the current height are compared to generate an adjustment amount whenever their difference is greater than a predetermined threshold. Visual guidance is presented to the occupant on an HMI display panel wherein the visual guidance describes taking an particular action to achieve the manual height adjustment of the D-ring mechanism. A further visual instruction is presented to the occupant on the HMI display panel wherein the visual instruction identifies the adjustment amount.

20 Claims, 4 Drawing Sheets

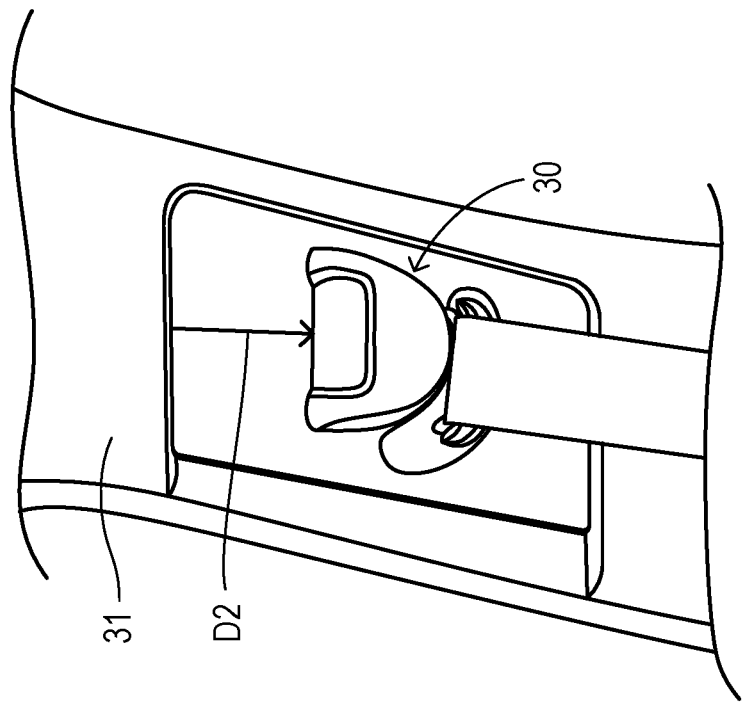
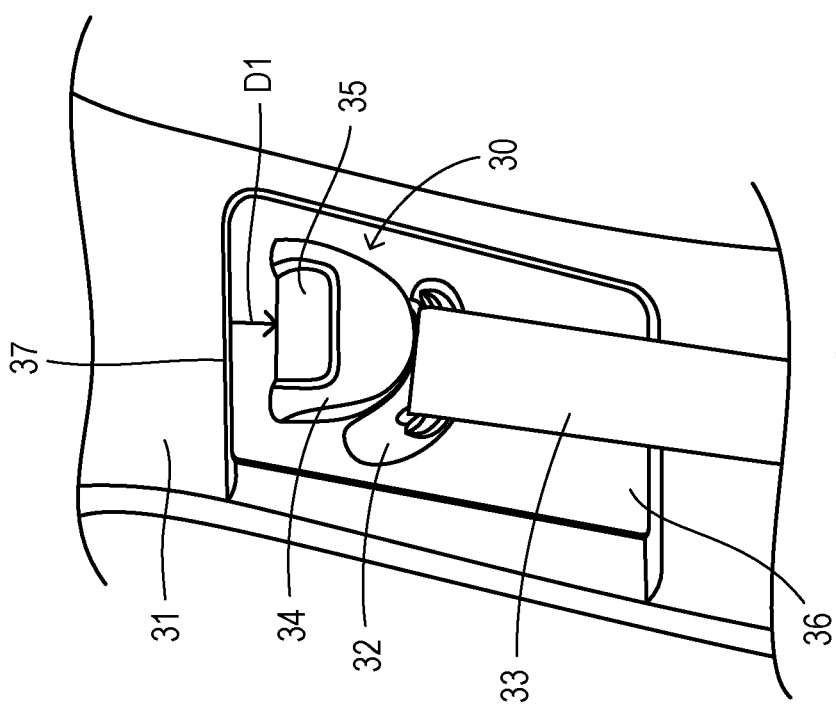

US 11,447,093 B1

SAFETY BELT D-RING POSITIONING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to adjustable safety belt restraints in motor vehicles, and, more specifically, to a help system for configuring an optimal height of a safety belt over a shoulder of a vehicle occupant.

Passenger seats in motor vehicles typically have adjustable positions to move forward, rearward, upward, and downward for optimal positioning relative to the controls, windows, and interior trim of the vehicle and for optimal passenger comfort. Seat position adjustments may be manual or powered. Powered seats (especially the driver seat and front passenger seat) may have customizable memory settings, so that optimized positions may be automatically restored for frequent users.

Front row seats often have a 3-point safety belt system to retain occupants in the seats. A seat belt webbing may have a lower end fixed to the vehicle (e.g., bolted near the floor of the passenger compartment on an outboard side of the seat). The webbing carries a slidable clip which selectably connects with a buckle attached to an inboard side of the seat. Above the clip, the belt webbing passes through a D-ring mechanism which is usually located on a pillar of the vehicle. After passing through the D-ring, the other end of the seat belt webbing may be engaged with a retractor that feeds out a variable length of belt webbing as needed to restrain the seat occupant.

The D-ring mounted to the pillar of the vehicle (e.g., the B pillar) supports the seat belt at the shoulder level of the occupant. The seat belt shoulder strap should ideally cross over the mid-shoulder area (i.e., not too close to the neck and not too close to the arm). If the shoulder strap lays on the arm or neck, it may be uncomfortable for the occupant and less effective in performing its restraint function. Thus, a target location for the shoulder strap is between the shoulder and neck.

When buckled, the seat belt webbing crosses over the occupant from the buckle up to the D-ring. The placement of the webbing in the area of the shoulder depends on the height of the D-ring and the position of the occupant's shoulder. In turn, the position of the occupant's shoulder depends on their body height and shape and on the adjusted positioning of the seat. For example, changes in seat position will affect the where the shoulder strap lays on the occupant.

In order to properly position the D-ring mechanism relative to the seat occupant, the D-ring height may be made vertically adjustable along the pillar to accommodate varying shoulder heights of different occupants. A motor or other actuator can be coupled with the D-ring mechanism to provide an automatic or powered adjustment system. An automatic system is disclosed in U.S. Pat. No. 10,035,513, entitled "Seat Belt Height System and Method," which is incorporated herein by reference in its entirety. However, most commercially available vehicles use manually adjustable D-ring mechanisms. An example of a manually adjustable D-ring is shown in U.S. Pat. No. 10,981,537, entitled "Seatbelt Height Adjuster," which is incorporated herein by reference in its entirety. In a manually adjustable system, a mechanical locking feature may be provided which must first be released before being able to change the height of the D-ring along the pillar.

In practice, occupants may not always adjust the height of the D-ring into an optimal position due to many reasons, such as 1) the D-ring is out of sight of the occupant, 2) the occupant is unaware that the position of the D-ring affects operation of the seat belt, 3) the occupant is busy and chooses not to take the time to adjust the D-ring, and/or 4) the occupant is unaware that a previous occupant changed the position of the D-ring.

The use of stored seat positions in a personalization memory for particular occupants/driver/passengers typically involves an automatic identification of a person accessing the vehicle (e.g., by identifying a dedicated key or by image recognition). While seat position and other personalization settings have been stored in memory, a D-ring height has not been included in personalization settings. Whenever the seat memory/personalization position is changed for different users accessing the vehicle, manually changing the position of the D-ring is usually required. However, many people do not know that the D-ring can be adjusted, resulting in reduced comfort and effectiveness.

SUMMARY OF THE INVENTION

Using interior camera(s) and/or interior sensing technology, differences between a target D-ring height and an actual height can be determined, and a vehicle occupant can be notified to perform a manual adjustment whenever needed.

In one aspect of the invention, a vehicle comprises a safety belt system for a front seat occupant having a belt webbing passing through a D-ring mechanism, wherein the D-ring mechanism has a manually adjustable height. A sensing system is configured to detect the front seat occupant and to collect A) first data of the front seat occupant indicative of a target height for the D-ring mechanism, and B) second data indicative of a current height of the D-ring mechanism. A controller is coupled to the sensing system and configured to 1) determine the target height in response to the collected first data, 2) determine the current height in response to the second data, and 3) compare the target height to the current height to generate an adjustment amount if a difference between the target height and the current height is greater than a predetermined threshold. An HMI display panel which is responsive to the controller presents to the front seat occupant A) a visual guidance describing an action to achieve the manual height adjustment of the D-ring mechanism, and B) a visual instruction identifying the adjustment amount.

BRIEF DESCRIPTION OF THE DRAWINGS

FIGS. 3 and 4 are perspective views of a second embodiment of an adjustable D-ring mechanism showing the D-ring mechanism at different heights.

DETAILED DESCRIPTION OF PREFERRED EMBODIMENTS

Figure 1:
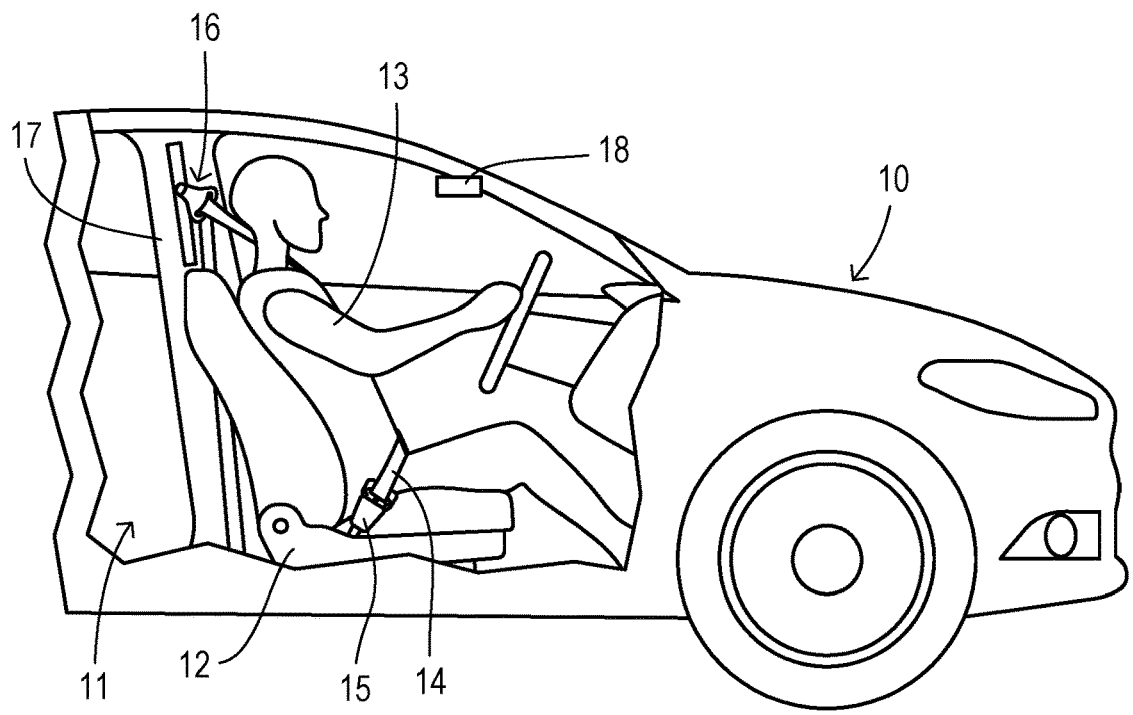
FIG. 1 is a side view of a vehicle having a driver in a driver's seat and wearing a 3-point safety belt system.

Referring to FIG. 1, a motor vehicle 10 has a passenger compartment 11 with a front seat 12 holding a driver/occupant 13. A 3-point safety belt system includes a belt webbing 14 which clips to a seat buckle 15 at an intermediate location and which passes through a D-ring mechanism 16 mounted at a B pillar 17. To achieve an optimal orientation of webbing 14 at a shoulder of occupant 13, D-ring mechanism 16 has an adjustable height so that it can maintain a desired relative height with respect to the shoulder of occupant 13.

Passenger compartment 11 may include one or more image sensors 18 (e.g., cameras) which are configured to capture data (e.g., images) to support detection of a height of a predetermined reference anatomy of occupant 13 (e.g., a shoulder or another feature from which a shoulder height can be inferred). Other sensors such as seat position sensors, ultrasonic sensors, and/or radar sensors, and other identification devices such as key fobs, ID cards, or transponders may used instead of or in combination with image sensors to characterize an identity and/or a shoulder height of an occupant.

Figure 2:
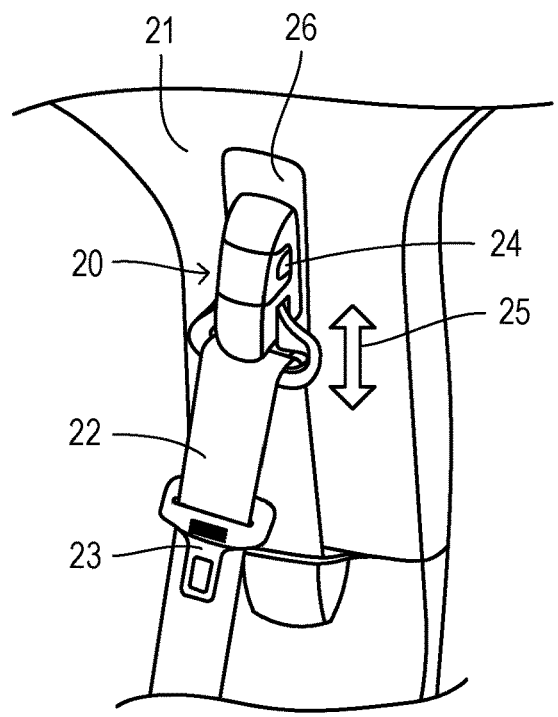
FIG. 2 is a perspective view of a first embodiment of an adjustable D-ring mechanism on a B-pillar.

FIG. 2 shows a first D-ring mechanism 20 on a B pillar 21. A belt webbing 22 carrying a clip 23 passes through D-ring 20 and extends down to a retractor (not shown) contained behind B pillar 21. By depressing a lock button 24 on D-ring mechanism 20, a user can raise or lower D-ring mechanism 20 along a vertical height adjustment range. A trim piece 26 is fixed to D-ring mechanism 20 and slides along with D-ring mechanism 20 to conceal an opening which accommodates D-ring mechanism 20 therein.

FIGS. 3 and 4 show another safety belt system with a D-ring mechanism 30 mounted at a B pillar 31. A D-ring 32 has a slot for passing through a belt webbing 33. A handle 34 includes a release button 35 which can be pressed by a user in order to raise or lower a height of D-ring 32. A sliding panel 36 associated with D-ring mechanism 30 provides a screen concealing an interior of B pillar 31 which could otherwise be visible through an opening in B pillar 31. A height of D-ring mechanism 30 can be measured relative to any fixed feature. Using an upper edge 37 of the opening in B pillar 31 may be selected to simplify image processing which may be used to determine D-ring actual height. For example, FIG. 3 depicts D-ring mechanism 31 at a first height which is a distance D1 below edge 37, and FIG. 4 depicts D-ring mechanism 31 at a second height which is a distance D2 below edge 37. Alternatively, a displacement sensor could be incorporated into D-ring mechanism 30 to directly sense the height.

Figure 5:
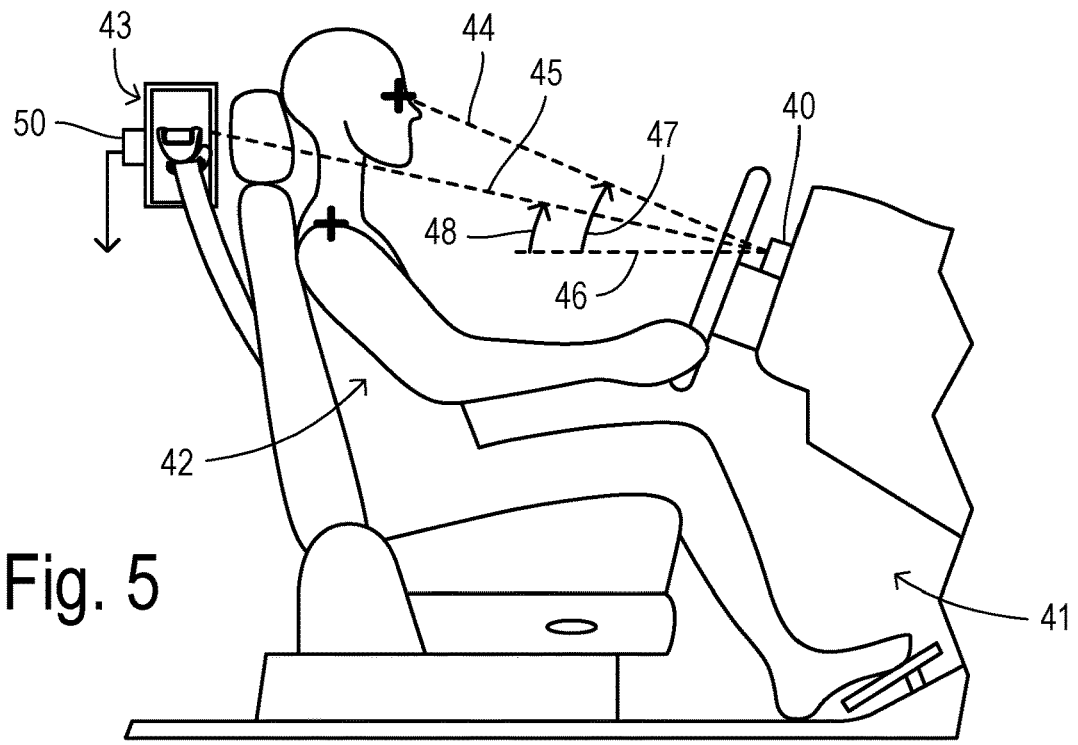
FIG. 5 is a side view of a driver's seat and a driver/occupant together with a B-pillar D-ring mechanism and image sensors for detecting heights of the D-ring and predetermined anatomical features of the occupant.

To determine an optimal placement of a D-ring height relative to a particular occupant (e.g., driver or passenger) in a front seat location, a direct measurement or a measurement-based estimate of the current heights of the D-ring and of the shoulder of the occupant are desired. In some embodiments, if the identity of an occupant is known then a previously obtained measurement may be obtained from a memory as a stored value. FIG. 5 depicts optical measurements of the D-ring and/or occupant heights. An image sensor 40 is mounted at a reference position in passenger compartment 41 and has a field of view covering at least a portion of an occupant 42 and a D-ring mechanism 43. Image sensor 40 may be comprised of a CCD camera or a CMOS camera, for example, and may be configured for visible light and/or infrared detection. An image processor (not shown) may inspect images from image sensor 40 using well known methods to detect predetermined image elements such as 1) the shoulder of the occupant or another reference anatomy (e.g., the eyes) which can be correlated to the level of the shoulder, and/or 2) a reference location on D-ring mechanism 43. The image processor may utilize pattern recognition, for example. The inspected image may include a height reference, such as an imaginary horizontal reference line corresponding to a horizontal line or plane 46 within passenger cabin 41 which corresponds to a known location in captured images due to image sensor 40 being installed at a reference position and a predetermined orientation.

FIG. 5 depicts a vector 44 corresponding to a detected location of the occupant's eyes in the inspected image which lies at an angular separation 47 from horizontal plane 46. Based on a distance from sensor 40 to the occupant's eyes, the height of the occupant's eyes can be determined. The sensor-to-occupant distance can be determined using a sensor (e.g., a time-of-flight sensor or other sensor incorporated with sensor 40) or based on an adjusted seat position, for example. An eye height can be converted to a shoulder height based on anthropometric data as explained in U.S. Pat. No. 10,035,513. Likewise, a height of D-ring mechanism 43 can be determined using an angular separation of a vector 45 pointing toward D-ring 43 and horizontal plane 46 and using a known distance from image sensor 40 to D-ring 43. Alternatively, a height of D-ring mechanism 43 can be measured according to an output from a displacement sensor 50 which may be incorporated with D-ring mechanism 43.

Figure 6:
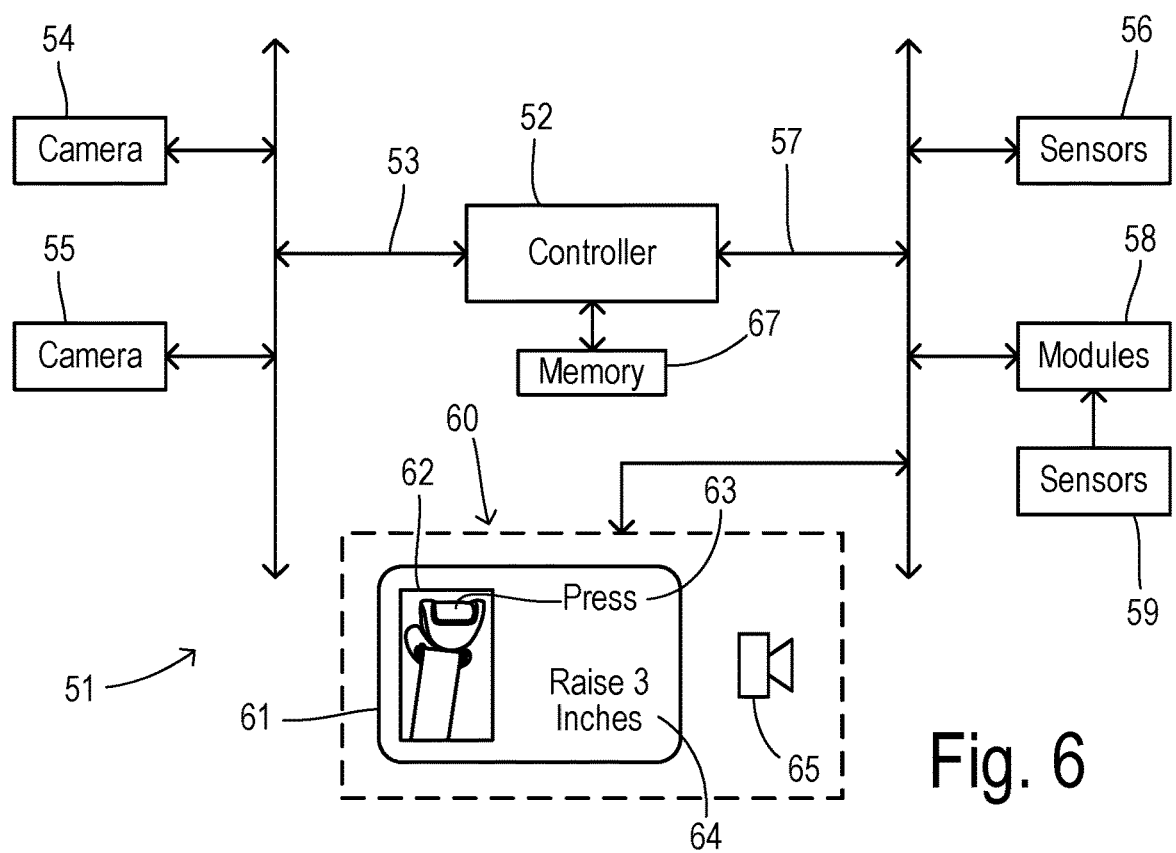
FIG. 6 is a block diagram showing a vehicle and a safety belt system according to a preferred embodiment.

FIG. 6 provides a block diagram showing main elements of a monitoring/notification system 51 for detecting an out-of-position D-ring mechanism and generating a notification and adjustment instructions to a vehicle occupant. A controller 52 may be a programmable electronic module which is configured to perform functions as described herein together with other vehicle control functions. Controller 52 has a memory 67 for storing data such as personal identifiers and associated target heights as determined for specific occupants. Controller 52 may be implemented within a main body control module, a driver information or infotainment module or a restraints control module, or it may be distributed over a plurality of such units. Controller 52 communicates with other devices using one or more wired or wireless communication links such as communication bus segments 53 and 57. The bus or buses may be comprised of a CAN bus, for example. Controller 52 is coupled by bus segment 53 to in-vehicle image sensors 54 and 55 which are arranged to capture images which may include the front seat occupant(s) and D-ring mechanism(s). Controller 52 is coupled by bus segment 57 to additional modules 58 and to additional sensors 56 such as seat position sensors or a D-ring displacement sensor. Modules 58 are coupled to other sensors and may relay sensor signals and/or other information (e.g., passenger identification data) to controller 52.

The cameras 54 and 55, sensors 56 and 59, and other modules 58 coupled to controller 52 provide a sensing system which is configured to detect the presence of a front seat occupant and to collect first data of the front seat occupant indicative of a target height for the D-ring mechanism, and second data indicative of a current height of the D-ring mechanism. The first data may include a captured image at least partially depicting the front seat occupant (which can be input to a pattern recognition analyzer to identify a location in the captured image of a reference anatomy of the front seat occupant, and then determines the target height for the D-ring mechanism according to a relation between the identified location and a shoulder location of the front seat passenger). The first data may include a stored personal identifier uniquely assigned to the front seat occupant and a respective stored target height previously determined by the sensing system. Alternatively, the first data can comprise a seat adjustment parameter within an available range of seat adjustment (e.g., to specify a camera to occupant distance). The second data may include a captured image at least partially depicting the D-ring mechanism of may comprise of an output of a displacement sensor.

Controller 52 determines the target height in response to the collected first data, determines the current height in response to the second data, and compares the target height to the current height to generate an adjustment amount if a difference between the target height and the current height is greater than a predetermined threshold.

A human machine interface (HMI) 60 is coupled to controller 52 via bus segment 57. HMI 60 includes a display panel 61 for providing graphic images and textual messages to the occupants and a sound transducer 65 (e.g., a speaker) for providing audible tones or messages. When a needed adjustment of D-ring height is determined using the procedures described herein, display panel 61 is used to present appropriate feedback to the front seat occupant(s) as assistance in obtaining a recommended D-ring height. The feedback may preferably be comprised of A) a visual guidance describing an action to achieve the manual height adjustment of the D-ring mechanism, and B) a visual instruction identifying the adjustment amount. As shown in FIG. 6, a graphic image 62 of the D-ring mechanism may be displayed along with a description 63 of an action to be performed in order to release the D-ring mechanism for adjustment (e.g., pressing a button on the mechanism and sliding the mechanism up or down). When an adjustment is needed, speaker 65 may be activated to reproduce a chime or other alerting sound to get the attention of the occupant(s).

Controller 52 may be further configured to monitor the second data after a manual adjustment of the D-ring mechanism to a modified height, compare the target height to the modified height, generate a new visual instruction identifying a new adjustment amount on the HMI display panel if a difference between the target height and the modified height is greater than the predetermined threshold, and generate a confirmation message on the HMI display panel if the difference between the target height and the modified height is less than the predetermined threshold. Controller 52 can store a personal identifier of the respective front seat occupant in association with the target height in a memory if the occupant is identifiable in the future and is not already represented in the stored data.

Figure 7:
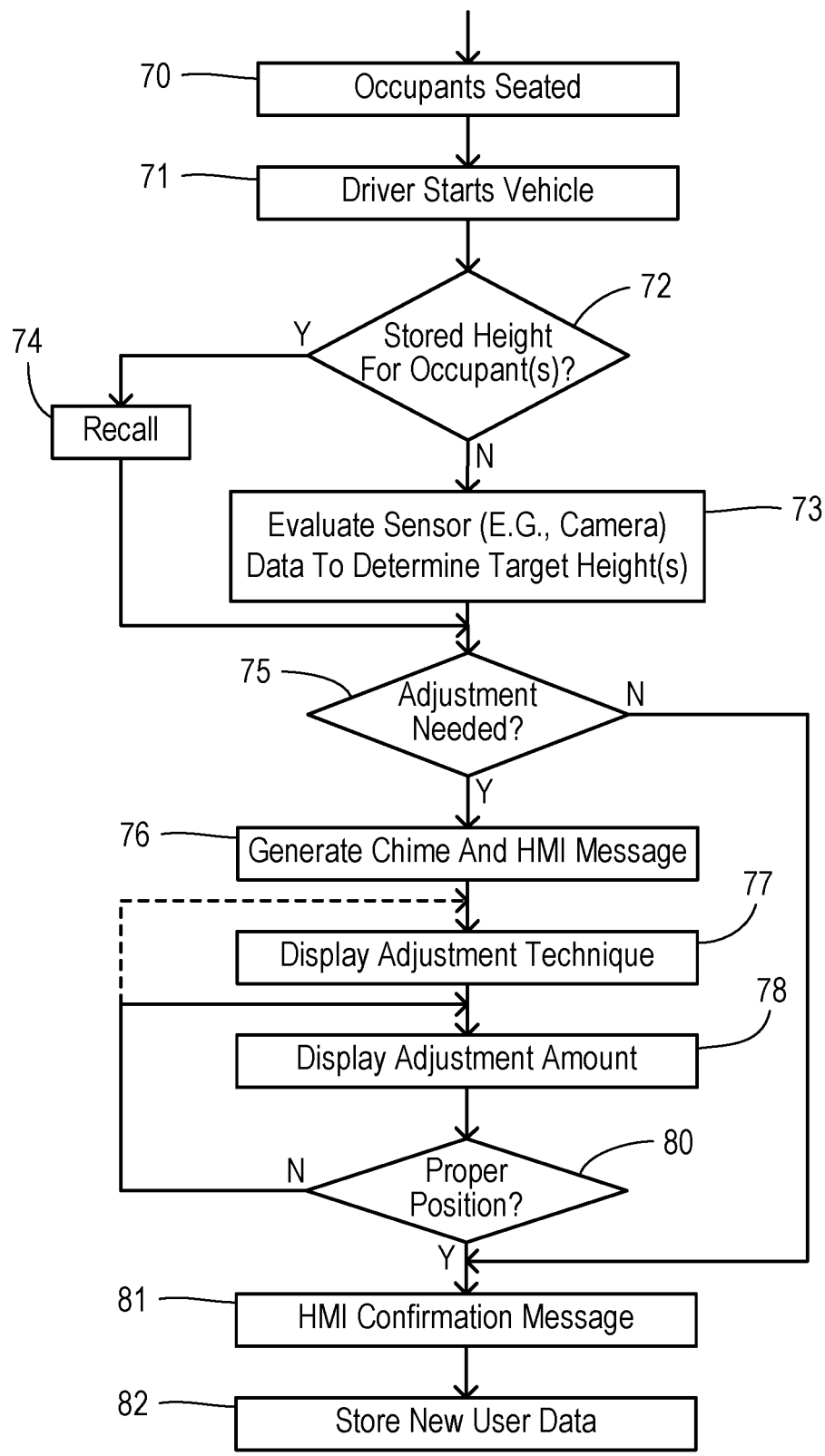
FIG. 7 is a flowchart showing one preferred method of the invention.

FIG. 7 shows one preferred method of the invention which begins at step 70 when one or more occupants become seated in seats having a corresponding safety belt extending through an adjustable-height D-ring mechanism. The vehicle is started by the driver in step 71. A check is performed in step 72 to determine whether any of the occupants in the relevant seating locations (e.g., front seats) have been identified as a specific user and have previously stored data (e.g., a target D-ring height or reference anatomy data) that can be used in determining the need for and/or amount of D-ring height adjustment. If a personal identifier associated with the identified user is found in memory, then a stored height (e.g., target D-ring height or height of the user) is recalled in step 54. If there is no personal identifier associated with the seat occupant, then sensor data (e.g., captured images, seat position, etc.) is evaluated in step 73 to determine various heights such as the actual height of the D-ring mechanism and the actual height of the shoulder (or other related anatomy) of the occupant, which can be used to determine a target height for the D-ring mechanism that optimizes comfort and effectiveness of the safety belt for the occupant.

In step 75, the target height of the D-ring is compared to the current actual height of the D-ring in order to determine whether any adjustment is needed.

Preferably, the comparison generates an adjustment amount whenever a difference between the target height and the current height is greater than a predetermined threshold. Differences less than the threshold may be ignored. The threshold may be about 0.5 inches, for example. The adjustment amount may be comprised of the difference between the target height and the current height, but the amount may be limited according to the ends of the movement range of the D-ring mechanism.

If an adjustment is needed, then an audible chime or other alerting tone or message may be generated as an audible cue in step 76 along with a corresponding message on the HMI display panel to inform an occupant that action needs to be taken in order to properly adjust their D-ring height. In step 77, the HMI display panel reproduces a visual guidance which describes/illustrates the action(s) which enables a vertical height adjustment of the D-ring mechanism. In step 78, the HMI display panel further reproduces a visual instruction which identifies the adjustment amount. In step 80, a re-check can be optionally performed which includes recapturing camera images or other sensor data to determine the current actual height of the D-ring mechanism has been adjusted to the proper height (e.g., within the predetermined threshold around the target height). If still not at a proper height, then a return can be made to steps 77 and 78, with the value of the adjustment amount updated in the event that the D-ring mechanism has been moved by some amount.

If a proper position is detected in step 80 or if no adjustment was needed in step 75, then an HMI confirmation message may be shown in step 81 as an acknowledgement to the occupant(s) that the D-ring mechanism is set at an optimal height. If a new identifiable person is detected to be in the seat, then corresponding data including a personal identifier and the target height for the D-ring based on the detected size of the occupant can be stored together in a memory for later recall when the same person sits in the same seat.

What is claimed is:

1. A vehicle comprising:
   a safety belt system for a front seat occupant having a belt webbing passing through a D-ring mechanism, wherein the D-ring mechanism has a manually adjustable height;
   a sensing system configured to detect the front seat occupant and to collect A) first data of the front seat occupant indicative of a target height for the D-ring mechanism, and B) second data indicative of a current height of the D-ring mechanism;
   a controller coupled to the sensing system and configured to 1) determine the target height in response to the collected first data, 2) determine the current height in response to the second data, and 3) compare the target height to the current height to generate an adjustment amount if a difference between the target height and the current height is greater than a predetermined threshold; and an HMI display panel responsive to the controller to present to the front seat occupant A) a visual guidance describing an action to achieve the manual height adjustment of the D-ring mechanism, and B) a visual instruction identifying the adjustment amount.

2. The vehicle of claim 1 wherein the controller is further configured to 4) monitor the second data after a manual adjustment of the D-ring mechanism to a modified height, 5) compare the target height to the modified height, 6) generate a new visual instruction identifying a new adjustment amount on the HMI display panel if a difference between the target height and the modified height is greater than the predetermined threshold, and 7) generate a confirmation message on the HMI display panel if the difference between the target height and the modified height is less than the predetermined threshold.

3. The vehicle of claim 2 wherein the controller is further configured to 8) store a personal identifier of the respective front seat occupant in association with the target height in a memory.

4. The vehicle of claim 1 wherein the sensing system comprises an image sensor located at a reference position, and wherein the first data is comprised of a captured image at least partially depicting the front seat occupant.

5. The vehicle of claim 4 wherein the controller is configured to 8) use pattern recognition to identify a location in the captured image of a reference anatomy of the front seat occupant, and 9) determine the target height for the D-ring mechanism according to a relation between the identified location and a shoulder location of the front seat occupant.

6. The vehicle of claim 1 wherein the first data comprises a stored personal identifier uniquely assigned to the front seat occupant and a respective stored target height previously determined by the sensing system.

7. The vehicle of claim 1 wherein the first data comprises a seat adjustment parameter within an available range of seat adjustment.

8. The vehicle of claim 1 wherein the sensing system comprises an image sensor located at a reference position, and wherein the second data is comprised of a captured image at least partially depicting the D-ring mechanism.

9. The vehicle of claim 1 wherein the sensing system comprises a displacement sensor coupled to the D-ring mechanism, and wherein the second data is comprised of an output of the displacement sensor.

10. The vehicle of claim 1 wherein the visual guidance is comprised of a graphic depiction of an action to release the D-ring mechanism for movement.

11. The vehicle of claim 1 further comprising a sound transducer coupled to the controller for generating an audible cue to the front seat occupant when a manual adjustment of the D-ring mechanism is needed.

12. A method of guiding a front seat occupant of a vehicle to manually adjust a height of a D-ring mechanism of a safety belt, comprising the steps of:

collecting first data of the front seat occupant indicative of a target height for the D-ring mechanism;

collecting second data indicative of a current height of the D-ring mechanism;

determining the target height in response to the collected first data;

determining the current height in response to the second data;

comparing the target height to the current height to generate an adjustment amount if a difference between the target height and the current height is greater than a predetermined threshold;

presenting a visual guidance to the front seat occupant on an HMI display panel wherein the visual guidance describes taking an action to achieve the manual height adjustment of the D-ring mechanism; and presenting a visual instruction to the front seat occupant on the HMI display panel wherein the visual instruction identifies the adjustment amount.

13. The method of claim 12 further comprising the steps of:

monitoring the second data after a manual adjustment of the D-ring mechanism to a modified height;

comparing the target height to the modified height;

generating a new visual instruction identifying a new adjustment amount on the HMI display panel if a difference between the target height and the modified height is greater than the predetermined threshold; and generating a confirmation message on the HMI display panel if the difference between the target height and the modified height is less than the predetermined threshold.

14. The method of claim 13 further comprising the step of storing a personal identifier of the respective front seat occupant in association with the target height in a memory.

15. The method of claim 12 wherein the step of collecting first data is comprised of capturing an image at least partially depicting the front seat occupant using an image sensor located at a reference position in the vehicle.

16. The method of claim 15 further comprising the steps of:

using pattern recognition to identify a location in the image of a reference anatomy of the front seat occupant; and determining the target height for the D-ring mechanism according to a relation between the identified location and a shoulder location of the front seat occupant.

17. The method of claim 12 wherein the first data comprises a stored personal identifier uniquely assigned to the front seat occupant and a respective stored target height.

18. The method of claim 12 wherein the step of collecting second data is comprised of capturing an image using an image sensor located at a reference position, wherein the image at least partially depicts the D-ring mechanism.

19. The method of claim 12 wherein the visual guidance is comprised of a graphic depiction of an action to release the D-ring mechanism for movement.

20. The method of claim 12 further comprising the step of generating an audible cue to the front seat occupant from a sound transducer when a manual adjustment of the D-ring mechanism is needed.

* * * * *